T. CLARK.
Weather-Strips.

No. 166,453. Patented Aug. 10, 1875.

Witnesses.
Chas. O. Gill
W. Hendley

Inventor.
Thompson Clark
by his Attys.
Cox & Co

UNITED STATES PATENT OFFICE.

THOMPSON CLARK, OF AKRON, OHIO.

IMPROVEMENT IN WEATHER-STRIPS.

Specification forming part of Letters Patent No. 166,453, dated August 10, 1875; application filed May 27, 1875.

*To all whom it may concern:*

Be it known that I, THOMPSON CLARK, of Akron, Summit county, Ohio, have invented a new and useful Improvement in Weather-Strips, of which the following is a specification, reference being had to the accompanying drawings.

The invention relates to an improved weather-strip, to be attached in a slot provided in the under edge of a door or window, and may be used effectively on any analogous device.

The object of the invention is to provide a cheap, durable, and effective device by the use of which dust and air may be excluded, and one which may be readily detached when desired.

Figure 1:
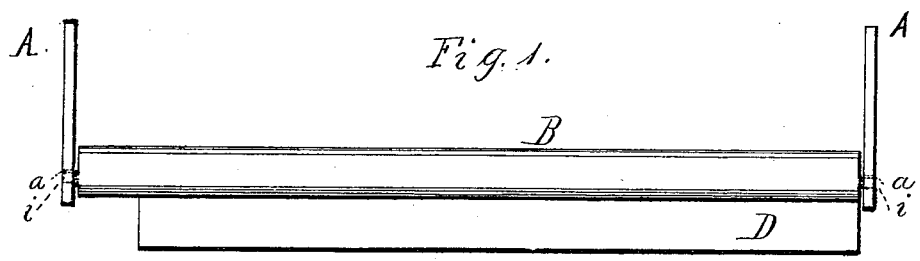
Figure 2:
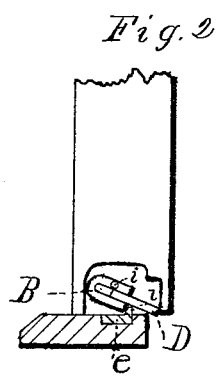

Figure 1 is a side elevation of a device embodying the elements of the invention. Fig. 2 is an end view, having one of the bearings detached.

In the accompanying drawings, A represents the bearings, which are secured to the sides of the door, and provided with the apertures a, through which the axles i of the bar B are passed, and secured therein in such manner as to insure to them a free movement. These axles are placed to one side of the vertical center of gravity of the bar B, so that the bar will swing up into the aperture in the lower edge of the door when open. Between the jaws of the bar B is securely attached edgewise a piece of soft material, D, (rubber preferred) in such manner that when the door is closed its lower edge will face the inside of the compartment to which the door is attached. In the lower right-hand corner of the casing is firmly secured the boss e, which, when the door is closed, presses against the edge of the bar B, thereby causing the strip D to turn down against the edge of the sill of the door.

The bearings A are composed of flat pieces of material, having apertures provided for the reception of screws to attach them to the edges of the door, and also for the reception of the axles i. The bar B is of solid material, having two of its edges drawn toward each other, inclosing the edge of the rubber D, and having the axles i at its ends. The boss e is formed of a piece of material having a protuberance, l, provided on its upper side, for the purpose of turning the edge of the rubber down against the sill, so that when the door is closed the rubber extends across the crevice below the door.

What I claim as my invention, and desire to secure by Letters Patent, is—

1. The bowed bar B, in combination with the axles i and rubber D, substantially as specified.

2. The bowed bar B, in combination with the axles i, rubber D, bearings A, and boss e, substantially as and for the purpose set forth.

In testimony that I claim the foregoing improvements in weather-strips, as above described, I have hereunto set my hand and seal this 20th day of May, 1875.

THOMPSON CLARK. [L. S.]

Witnesses:
 GEO. H. GOBLE,
 REUBEN SHERBORD.